Sept. 30, 1941.   A. G. LARSON   2,257,302
ELECTRIC BRAKE SYSTEM
Filed Sept. 17, 1940
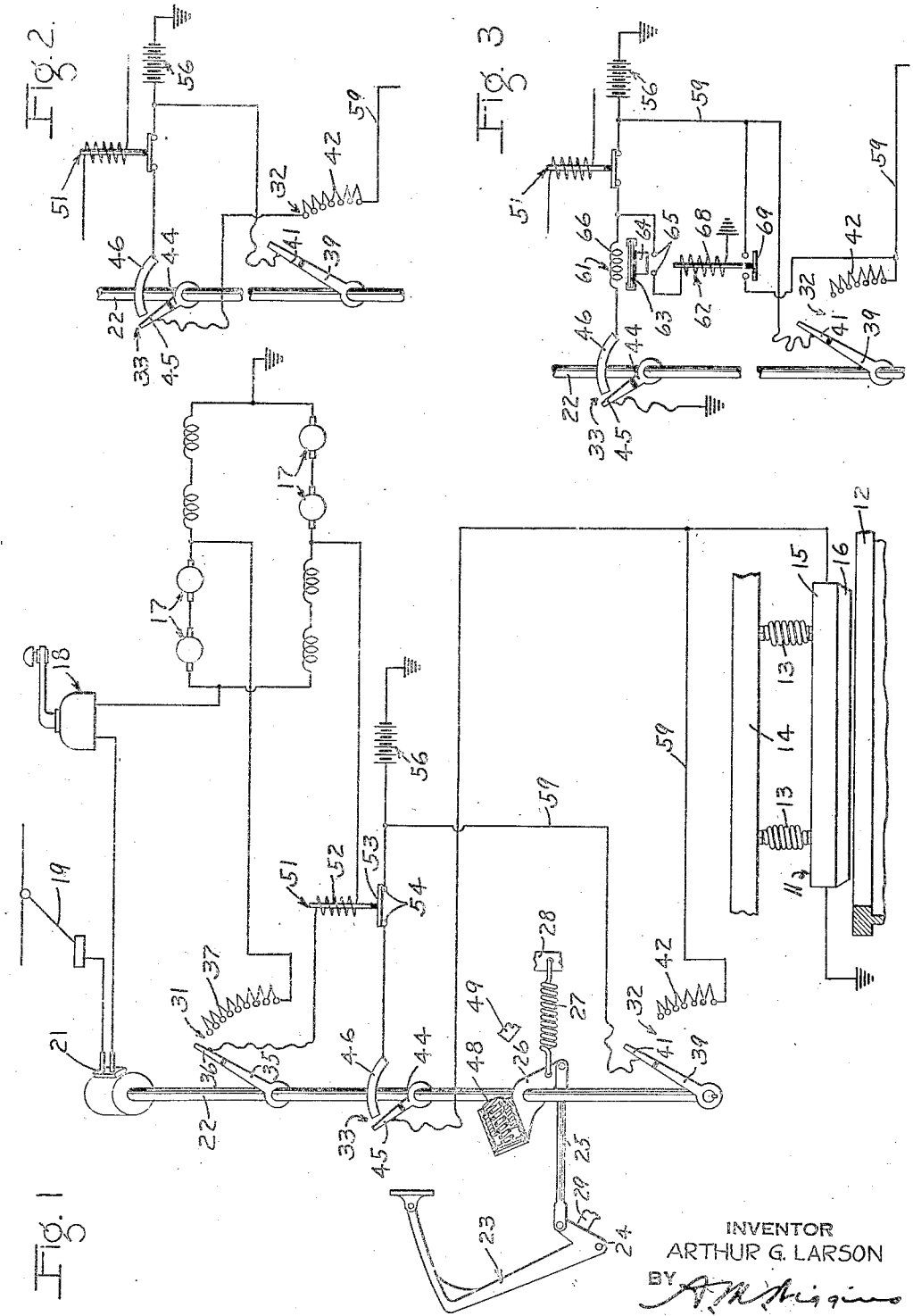
INVENTOR
ARTHUR G. LARSON
BY
ATTORNEY Patented Sept. 30, 1941

2,257,302

UNITED STATES PATENT OFFICE 2,257,302

ELECTRIC BRAKE SYSTEM

Arthur G. Larson, Forest Hills, Pa., assignor to The Westinghouse Air Brake Company, Wilmerding, Pa., a corporation of Pennsylvania Application September 17, 1940, Serial No. 357,124

13 Claims. (Cl. 188—158)

This invention relates to electric brake systems for vehicles, such as street railway cars, of the type having magnetic track brakes and dynamic brakes.

It is an object of my invention to provide an electric brake system for a vehicle including magnetic track brakes and dynamic brakes and characterized by an arrangement for normally effecting application of the dynamic brakes and magnetic track brakes sequentially and effective, in the event of the failure of the dynamic brakes to produce a braking effect in response to the initiation of a brake application, to automatically cause immediate application of the magnetic track brakes.

It is a further object of my invention to provide an electric brake system of the type indicated in the foregoing object and further characterized by an arrangement for suppressing the application of the magnetic track brakes as long as the dynamic brakes exceed a certain degree of effectiveness unless an application in excess of a certain degree is called for by the operator.

It is another object of my invention to provide an electric brake system of the type indicated in the foregoing objects and further characterized by means for preventing the momentary application of the magnetic track brakes during the interval of time that the dynamic brake application is building-up to a sufficient degree of effectiveness, following the initiation of the brake application to cause suppression of the magnetic track brakes.

The above objects, and other objects of my invention which will be made apparent hereinafter, are obtained by means of several embodiments of my invention subsequently to be described and shown in the accompanying drawing, wherein Fig. 1 is a diagrammatic view showing one embodiment of my invention, and Figs. 2 and 3 are fragmental views showing two different modifications of Fig. 1, respectively.

Referring to Fig. 1, the electric brake system shown comprises a suitable number of conventional magnetic track brake devices 11, only one of which is shown, suspended normally in wellknown manner a predetermined clearance distance above the track rail 12 as by suspension springs 13 of the coil type attached to a part 14 of the vehicle truck frame. Upon energization of the electromagnet winding or windings 15 of the track brake device 11, the contact portion 16 of the track brake device is attracted magnetically to the rail and frictionally engaged therewith to exert a retarding effect on the vehicle, the degree of retarding effect varying with the degree of energization of the electromagnet winding 15.

The brake system further comprises dynamic brakes illustrated in the form of the propulsion motors 17 of the vehicle shown as connected in series-parallel arrangement in well known manner.

Current is supplied to the propulsion motors 17 to cause propulsion of the car, under the control of a suitable power controller 18, from an external source by way of a collector device or trolley 19. The power circuit for the motors includes an interlock contact 21 on a brake control or brake operating shaft 22. As will hereinafter appear, when the brakes are released, the contact 21 engages a pair of associated stationary contacts so as to permit the supply of power current to the propulsion motors under the control of power controller 18. Conversely, when the brake control shaft 22 is rotated in the manner subsequently to be described to initiate a brake application, the interlock contact 21 is moved to automatically interrupt the power circuit.

Rotation of the brake control shaft 22 is effected under the control of the operator as by a brake pedal 23 suitably fulcrumed, as on a pin 24, and connected by a link 25 to an arm 26 fixed to the brake control shaft 22.

A spring 27 secured at one end to the arm 26 and at the other end to a fixed part 28 of the vehicle biases the arm 26 and consequently the brake control shaft 22 to its normal brake release position in which it is shown. A stop 29 limits the movement of the brake pedal 23 under the influence of the spring 27 to determine the normal brake release position thereof.

Upon depression of the brake pedal 23, the arm 26 and the control shaft 22 are rotated in a clockwise direction against the resisting force of the spring 27 to a degree corresponding to the degree of depression of the brake pedal.

Rotation of the brake control shaft 22 out of its normal brake release position effects operation of a dynamic brake rheostat 31, a magnetic track brake rheostat 32 and a switch device 33.

As diagrammatically shown, the dynamic brake rheostat 31 may comprise an arm 35 fixed on the brake control shaft 22 and having an insulated contact tip 36 adapted to slidably engage the contact taps of a suitable resistor 37 to establish the dynamic braking circuit for the propulsion motors 17 and cut out an increasing amount of the resistor 37 as the degree of rotation of the brake control shaft 22 out of its normal brake release position increases. The arrangement of the rheostat arm 35 and the first contact tap of the resistor 37 is such as to establish the dynamic braking circuit after the control shaft 22 is shifted rotarily out of its brake release position sufficiently for interlock contact 21 to interrupt the power circuit for the motors 17.

The magnetic track brake rheostat 32 may comprise an arm 39 fixed on the control shaft 22 and having an insulated contact tip 41 adapted to slidably engage in succession the several contact taps of a suitable resistor 42 in response to rotary movement of the control shaft 22 out of its normal brake release position. The arrangement of the resistor 42 with respect to the arm 39 of the track brake rheostat 32 is such that the degree of rotation of the control shaft 22 out of its normal brake release position required to effect the initial engagement of the contact tip 41 with the end contact tap of the resistor 42 is greater than in the case of the dynamic brake rheostat 31. Thus, as will hereinafter clearly appear, the dynamic brakes only or both the dynamic brakes and magnetic track brakes are applied according to the degree of depression of brake pedal 23.

The switch device 33 may comprise an arm 44 fixed on the control shaft 22 and having an insulated contact tip 45 adapted upon a slight initial movement of the control shaft out of its normal brake release position to engage an arcuate contact segment 46. The segment 46 is sufficiently long that contact tip 45 remains in engagement therewith throughout further rotary displacement of the control shaft 22 out of its normal brake release position.

In order to establish a certain maximum degree of rotary displacement of the control shaft 22 out of its normal brake release position, the arm 26 may be provided, as shown, with a spring-biased or resilient stop 48 which is adapted to engage a fixed stop 49 on the vehicle frame.

In accordance with my invention, I further provide a lock-out or suppression relay 51 having an operating winding 52 arranged in the dynamic braking circuit of the propulsion motors 17. The winding 52 of the lock-out relay 51 is so designed that whenever and as long as the current in the dynamic braking circuit exceeds a certain value, the movable contact 53 of the relay is picked-up or raised out of engagement with an associated pair of stationary contacts 54.

The contacts of the relay 51 and the switch device 33 are arranged in series relation with the electromagnet windings 15 of the magnetic track brake device 11 in a suitable circuit including a source of electric current, such as a storage battery 56. Thus, if the relay 51 is dropped out while the switch 33 is closed, the electromagnet windings 15 of the magnetic track brake device 11 are energized by a maximum current and the track brakes accordingly applied to a maximum degree.

The magnetic track brake rheostat 32 is arranged in a branch circuit 59 paralleling the lock-out relay 51 and switch 33 to establish the circuit for energizing electromagnet windings 15 of the magnetic track brake device 11 upon a sufficient degree of displacement of the brake control shaft 22 out of its brake release position and thereafter reduce the amount of the resistor 42 in the circuit as the displacement of the control shaft 22 increases to correspondingly increase the energizing current.

To explain the operation of the apparatus in greater detail, let it be supposed that the car is traveling along the road with the power controller 18 in its power supply position while the brake pedal 23 is released and that the operator desires to effect an application of the brakes to bring the car to a stop. To do so, the operator first shifts the power controller 18 to its power-off position, and then depresses the brake pedal 23 an amount corresponding to the desired degree of application of the brakes.

In case the operator fails to return the power controller 18 to its power-off position, the interlock contact 21 instantly interrupts the power circuit to the motors 17 in response to the depression of the brake pedal 23. Thereafter, the contact tip 36 on the arm 35 of the dynamic brake rheostat 31 engages the end tap of the resistor 37 and thereby establishes the dynamic braking circuit for the motors 17. This dynamic braking circuit is readily apparent and needs no description.

The switch 33 is closed at substantially the same time that the dynamic braking circuit is established and accordingly until the dynamic braking current builds-up sufficiently to cause pick-up of the lock-out relay 51, the circuit is established for energizing the electromagnet windings 15 of the track brake device 11 to a maximum degree by way of the serially-related relay 51 and switch 33.

When the dynamic braking current builds-up to a sufficient degree to cause pick-up of the relay 51, which it ordinarily does in a fraction of a second, the circuit for energizing the windings 15 of the track brake device 11 is interrupted by relay 51. In view of the fact that the dynamic braking current builds-up to its maximum value determined by the amount of the resistor 37 in the circuit in a fraction of a second, the magnetic track brake device 11 is only momentarily applied. If, however, the dynamic braking current fails to build-up for some reason, the lock-out relay 51 remains in its dropped-out or closed position and consequently the electromagnet windings 15 of the track brake device 11 remain energized to a maximum degree. Thus in the event of failure of a dynamic brake application to materialize in normal manner, the track brakes immediately become applied to the fullest degree.

Assuming that the dynamic braking current builds-up in the proper manner so as to cause pick-up of the lock-out relay 51 and consequent deenergization of the electromagnet windings 15 of the track brake device 11, and that the degree of displacement of the brake control shaft 22 out of its normal brake release position is insufficient to establish the energizing circuit for the electromagnet winding 15 by way of the track brake rheostat 32, the energizing circuit for the electromagnet windings 15 is again established and the track brake device applied when the dynamic braking current diminishes sufficiently to cause drop-out of the relay 51. This ordinarily occurs as the vehicle decreases below a certain low speed in approaching a stop.

Let it be supposed now that the operator depresses the pedal 23 to the maximum extent to effect engagement of the spring-biased stop 48 with the fixed stop 49. In so doing, the control shaft 22 is rotated sufficiently to cut-out substantially all of the resistor 37 in the dynamic braking circuit and substantially all of the resistor 42 in the magnetic track brake circuit. Thus the dynamic brakes and magnetic track brakes 11 are simultaneously applied to the maximum degree. If the dynamic brakes fail so that the lock-out relay 51 correspondingly fails to be picked-up, the full energization of the electromagnet windings 15 of the track brake device 11 is at all events assured.

When the car comes to a complete stop, the operator may release the brake pedal 23. Spring 27 thus restores the brake control shaft 22 to its normal position interrupting the dynamic braking circuit and the circuit for energizing the magnet windings of the track brake device 11.

If the electromagnet windings 15 of the track brake device 11 are suitably designed so as to be able to be continuously energized while the car is stopped, the operator may hold the brake pedal 23 depressed while the car is stopped so as to maintain the electromagnet windings 15 energized. In such case the track brake device 11 serves to hold the car in a stopped position.

If the source of current for energizing the track brake device 11 is a storage battery on the car, the continuous energization of the electromagnet windings 15 thereof for any considerable length of time would be apt to deplete the energy in the battery very rapidly. It is desirable, therefore, to provide an auxiliary parking brake of any suitable type such as the parking brakes applied to the wheels of an automotive vehicle for holding the car stationary in a stopped position to enable the operator to release the brake pedal 23 and thus interrupt the energizing circuit for the electromagnet windings 15 of the track brake device 11.

A modified arrangement is shown in Fig. 2. This arrangement differs from that in Fig. 1 in that the circuit for energizing the electromagnet windings 15 of the track brake device 11 under the control of the lock-out relay 51 and switch 33 includes a portion, illustrated as a11, of the resistor 42 of the magnetic track brake rheostat 32.

Essentially, therefore, the arrangement of Fig. 2 differs from that in Fig. 1 in effecting automatic energization of the electromagnet windings of the track brake device 11 to some degree less than the maximum degree in the event of failure of the dynamic brakes or at the time the speed of the vehicle reduces below a certain low speed.

Obviously, if the brake pedal 23 is sufficiently depressed, the resistor 42 or any portion thereof may be shunted to increase the degree of energization of the track brake electromagnet windings 15.

In the arrangements shown in Figs. 1 and 2, the electromagnet windings 15 of the track brake device 11 are momentarily energized immediately following the initiation of a brake application due to the interval of time required for the dynamic braking current to build-up sufficiently to operate the lock-out relay 51 to open position and effect the deenergization of the electromagnet windings of the track brake device. In Fig. 3 I have provided an arrangement for preventing this momentary energization of the electromagnet winding of the track brake 11 following the initiation of the brake application.

The arrangement of Fig. 3 differs from that in Fig. 1 in having a slow-acting switch device 61 and an auxiliary relay 62 controlled thereby for establishing the circuit for energizing the electromagnet windings 15 of the track brake device 11 only after a predetermined time elapses following the initiation of a brake application which time is sufficiently long to enable the dynamic braking current to build-up sufficiently to pick-up the lock-out relay 51 if the dynamic brakes are operating properly.

As diagrammatically shown, the slow-acting switch device 61 may comprise a bi-metallic thermal-responsive element 63 having a contact 64 thereon for engaging an associated pair of fixed or stationary contacts 65. When the bi-metallic element 63 is cold, the contact 64 is disengaged from the contacts 65. When the bi-metallic element 63 is heated, however, the contact 64 is shifted into engagement with the contacts 65.

Associated with the bi-metallic element 63 is a heating coil 66. Heating coil 66 is arranged in the circuit of battery 56 and is under the joint control of the serially related lock-out relay 51 and the switch device 33. Thus, when an application of the brakes is initiated, the heating coil 66 is heated by flow of current therethrough. The heating coil is so designed in relation to the bi-metallic element 63 that after a predetermined time sufficiently long for the dynamic braking current to build-up in excess of a value sufficient to pick-up the lock-out relay 51, the contact 64 is actuated to engage the contacts 65.

The relay 62 is a conventional relay having an operating winding 68 and a contact 69 which is actuated to closed position in response to energization of the winding 68.

The winding 68 of the relay 62 is adapted to be energized under the joint control of the lock-out relay 51 and the slow-acting switch 61 so that if the lock-out relay is dropped-out and the slow-acting switch is closed, the circuit for energizing the operating winding of the relay is completed. The relay 62 is so arranged that upon the closure of the contact 69 thereof, a circuit is completed for energizing the electromagnet windings of the track brake device 11.

In operation, when the brake pedal 23 is depressed to initiate a brake application, the dynamic braking circuit is established as in the arrangement shown in Fig. 1. Switch 33 is, at the same time, closed to cause flow of current through the heating coil 66 of the slow-acting switch 61 as long as the lock-out relay 51 remains dropped-out. Before the slow-acting switch 61 is closed in response to the energization of the heating coil 66, the dynamic braking current will in the normal manner of operation have built-up sufficiently to cause pick-up of the lock-out relay 51, thereby deenergizing the heating coil 66. Momentary energization of the electromagnet windings 15 of the track brake device 11 is thus prevented.

If the brake pedal 23 is sufficiently depressed, the circuit for energizing the electromagnet windings 15 of the track brake device 11 will be established by way of the magnetic track brake rheostat 32, the degree of energization of the electromagnet windings 15 depending upon the amount of the resistor 42 of the rheostate 32 in the circuit.

Whenever the dynamic braking current falls sufficiently as the car approaches the stop, the lock-out relay 51 drops-out and closes the circuit for energizing the heating coil 66 of the slow-acting switch 61. After the elapse of a predetermined interval, such as a fraction of a second, the contact 64 of the slow-acting switch is shifted to its closed position and thus establishes the circuit for energizing the winding 68 of the relay 62, the contacts of which are accordingly actuated to closed position. Relay 62 accordingly establishes the circuit for energizing the electromagnet windings 15 of the track brake device 11 to a maximum degree.

Upon the release of the brake pedal 23 and the consequent restoration of the control shaft 22 to its normal brake release position, the dynamic braking circuit and the magnetic track brake circuit are interrupted at the rheostats 31 and 32 as in the case of the arrangement shown in Fig. 1. At the same time, the opening of the switch device 33 interrupts the circuit for energizing the heating coil 66 of the slow-acting switch 61, which is accordingly promptly restored to its normal open position. The operating winding of the relay 62 is accordingly deenergized and the relay contacts restored to open position, thereby deenergizing the electromagnet windings 15 of the track brake device 11.

As in the case of Fig. 1, an auxiliary or parking brake associated with the car wheels may be provided for holding the car while stopped or, if desired, to supplement at any time the dynamic and magnetic track brakes.

While I have shown and described only several embodiments of my invention, various omissions, additions or modifications may be made therein without departing from the spirit of my invention. It is accordingly not my intention to limit the scope of my invention except in accordance with the terms of the appended claims.

Having now described my invention, what I claim as new and desire to secure by Letters Patent is:

1. A vehicle brake system of the type having dynamic brake means and magnetic track brake means, comprising the combination of means under the control of the operator for initiating application of only the dynamic brake means, and means controlled according to the degree of effectiveness of the dynamic brake means for effecting application of the magnetic track brake means when the degree of effectiveness of the dynamic brake means reduces below a certain degree incidental to the reduction of the speed of the vehicle.

2. A vehicle brake system of the type having dynamic brake means and magnetic track brake means, comprising the combination of means for initiating application of only the dynamic brake means, and means automatically effective to cause application of the magnetic track brake means if the dynamic brake means does not exceed a certain degree of effectiveness.

3. A vehicle brake system of the type having electric propulsion motors adapted to act as dynamic brakes and having also magnetic track brake means, comprising the combination of means under the control of the operator for initiating operation of the motors to dynamically brake the vehicle, means controlled according to the dynamic braking current for automatically causing application of the magnetic track brake means whenever the dynamic braking current does not exceed a certain value in response to the operation of the operator controlled means, and means for preventing the last said means from causing application of the magnetic track brake means for a certain uniform time following operation of the operator-controlled means to initiate operation of the motors as dynamic brakes.

4. A vehicle brake system of the type having magnetic track brake means and dynamic brake means including a dynamic braking circuit, comprising the combination of means under the control of the operator for establishing the dynamic braking circuit to cause the dynamic brake means to exert a braking effect on the vehicle, switch means responsive to operation of the said control means, electroresponsive means responsive to the current in the dynamic braking circuit, said switch means and electroresponsive means being jointly effective to cause energization of the magnetic track brake means and the consequent application thereof whenever or as long as the dynamic braking current does not exceed a certain value.

5. A vehicle brake system of the type having dynamic brake means and magnetic track brake means, the combination of means under the control of the operator having a normal position in which both the dynamic brake means and the magnetic track brake means are released and operative out of the normal position within a first zone to initiate application of only the dynamic brake means and thereafter as the degree of displacement thereof out of its normal position further increases into a second zone to also initiate application of the magnetic track brake means, and means effective whenever and as long as the dynamic brake means does not exceed a certain degree of effectiveness for automatically initiating application of the magnetic track brake means notwithstanding the fact that the said control means is not displaced out of its normal position into the second zone of movement thereof.

6. A vehicle brake system of the type having dynamic brake means and magnetic track brake means, comprising the combination of means for initiating application of the dynamic brake means, slow-acting switch means effective upon the elapse of a certain interval of time following the initiation of application of dynamic brake means for effecting application of the magnetic track brake means, and means effective to prevent application of the magnetic track brake means if the dynamic brake means exceeds a certain degree of effectiveness within said certain interval of time.

7. A vehicle brake system of the type having dynamic brake means and magnetic track brake means, comprising the combination of brake control means having a normal brake release position and operative different degrees out of its normal position to initiate and control the degree of application of the dynamic brake means, slow-acting switch means operative upon the elapse of a certain uniform interval of time following the operation of the said control means to initiate application of the dynamic brake means for effecting application of the magnetic track brake means, means effective to prevent the application of the magnetic track brake means in response to the operation of the slow-acting switch means if the dynamic brake means exceeds a certain degree of effectiveness within said certain interval of time, and means effective to cause application of the magnetic track brake means at any time upon the displacement of the said control means out of its normal position in excess of a certain amount greater than that required to initiate the application of the dynamic brake means.

8. A vehicle brake system of the type having magnetic track brake means and dynamic brake means including a dynamic braking circuit, comprising the combination of means under the control of the operator for establishing the dynamic braking circuit to cause the dynamic brake means to exert a braking effect on the vehicle, electroresponsive means controlled according to the current in the dynamic braking circuit, switch means operated in response to the operation of the operator-controlled means, a bi-metallic thermal-responsive switch device having a heating coil controlled jointly by said electroresponsive means and said switch means, said thermal-responsive switch device being operative in response to the continued supply of heat by the heating coil for a time longer than a certain uniform time following operation of the operator-controlled means to initiate application of the dynamic brake means, for effecting application of the magnetic track brake means, said electroresponsive means being effective to deenergize the heating coil of the thermal-responsive switch device and prevent the application of the magnetic track brake means if the current in the dynamic braking circuit exceeds a certain value within said certain uniform time.

9. A vehicle brake system of the type having dynamic brake means and magnetic track brake means, comprising the combination of means for initiating an application of and varying the degree of effectiveness of the dynamic brake means, means for initiating and varying the degree of application of the magnetic track brake means between a minimum and a maximum value, said dynamic brake control means and magnetic track brake control means being operative to cause application of only the dynamic brake means or application of both the dynamic brake means and the magnetic track brake means, and means effective upon application of the dynamic brake means and controlled according to the effectiveness thereof for causing application of the magnetic track brake means to a maximum degree, if the effectiveness of the dynamic brake means does not exceed a certain degree.

10. A vehicle brake system of the type having dynamic brake means and magnetic track brake means, the combination of brake control means operative to initiate application of the dynamic brake means only, means automatically effective upon application of the dynamic brake means unless the effectiveness of the dynamic brake means exceeds a certain degree for causing application of the magnetic track brake means to a certain degree, and means under the control of the said brake control means for thereafter increasing the application of the magnetic track brake means above said certain degree.

11. A vehicle brake system of the type having dynamic brake means and magnetic track brake means, comprising the combination of manually operated means having a normal brake release position and effective in a first zone of movement out of the release position to cause application of only the dynamic brake means and effective in a second zone of movement following the first zone for causing simultaneous application of the dynamic brake means and the magnetic track brake means, and means responsive according to the degree of effectiveness of dynamic brake means for causing application of the magnetic track brake means, notwithstanding the fact that the said manually operated means remains in the first zone of movement thereof, if the degree of effectiveness of the dynamic brake means does not exceed a certain value.

12. A vehicle brake system of the type having dynamic brake means and magnetic track brake means, comprising the combination of means for initiating application of the dynamic brake means, means automatically effective to cause application of the magnetic track brake means at the expiration of a certain uniform time following initiation of application of the dynamic brake means, and means effective if the dynamic brake means exceeds a certain degree of effectiveness within said certain uniform time for preventing application of the magnetic track brake means by the last said means.

13. A vehicle brake system of the type having electric propulsion motors adapted to act as dynamic brakes and having also magnetic track brake means, comprising the combination of means under the control of the operator for initiating operation of the motors to dynamically brake the vehicle, means automatically effective to cause application of the magnetic track brake means at the expiration of a certain uniform time following operation of the operator-controlled means to initiate operation of the motors to dynamically brake the vehicle, and means effective if the braking effect exerted by the motors exceeds a certain degree within said certain uniform time for preventing application of the magnetic track brake means by the last said means.

ARTHUR G. LARSON.